(12) United States Patent
Stoller et al.

(10) Patent No.: US 9,879,702 B2
(45) Date of Patent: *Jan. 30, 2018

(54) INTEGRATED IMPLEMENT DOWNFORCE CONTROL SYSTEMS, METHODS, AND APPARATUS

(71) Applicant: PRECISION PLANTING LLC, Tremont, IL (US)

(72) Inventors: Jason Stoller, Morton, IL (US); Kent Levy, Morton, IL (US); Todd Swanson, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 437 days.

This patent is subject to a terminal disclaimer.

(21) Appl. No.: 14/417,145

(22) PCT Filed: Jul. 25, 2013

(86) PCT No.: PCT/US2013/051968
§ 371 (c)(1),
(2) Date: Jan. 24, 2015

(87) PCT Pub. No.: WO2014/018716
PCT Pub. Date: Jan. 30, 2014

(65) Prior Publication Data
US 2015/0176614 A1    Jun. 25, 2015

Related U.S. Application Data

(60) Provisional application No. 61/675,678, filed on Jul. 25, 2012.

(51) Int. Cl.
*F15B 15/02* (2006.01)
*F15B 15/20* (2006.01)
(Continued)

(52) U.S. Cl.
CPC ............ *F15B 15/204* (2013.01); *A01C 5/062* (2013.01); *A01C 5/064* (2013.01); *A01C 7/205* (2013.01); *F15B 15/20* (2013.01)

(58) Field of Classification Search
CPC .......... A01C 5/062; A01C 5/064; A01C 7/205
(Continued)

(56) References Cited

U.S. PATENT DOCUMENTS

| 2,627,797 A | 2/1953 | Acton |
| 3,233,523 A * | 2/1966 | Passaggio ........... F15B 13/0402 91/459 |

(Continued)

FOREIGN PATENT DOCUMENTS

| EP | 0372901 B1 | 2/1994 |
| WO | 2008008345 A2 | 1/2008 |
| WO | 2008008347 A2 | 1/2008 |

*Primary Examiner* — Thomas E Lazo
(74) *Attorney, Agent, or Firm* — Thomas J. Oppold; Larkin Hoffman Daly & Lindgren, Ltd.

(57) ABSTRACT

A downforce controller for an agricultural implement having a double-acting hydraulic cylinder. The cylinder is configured to be coupled to an agricultural row unit and an agricultural toolbar for transmitting a net downforce between the agricultural toolbar and the agricultural row unit. A first pressure in the first chamber of the cylinder and a second pressure in the second chamber of the cylinder having counteracting effects on the net downforce. A manifold coupled to the cylinder is in fluid communication with the first chamber. A pressure control valve supported by the manifold is in fluid communication with the manifold and the first chamber.

19 Claims, 10 Drawing Sheets

(51) Int. Cl.
*A01C 5/06* (2006.01)
*A01C 7/20* (2006.01)

(58) Field of Classification Search
USPC .............................. 91/54, 59, 423; 172/637
See application file for complete search history.

(56) References Cited

U.S. PATENT DOCUMENTS

| | | | |
|---|---|---|---|
| 3,658,133 A | 4/1972 | Sweet et al. | |
| 4,009,668 A | 3/1977 | Brass et al. | |
| 4,031,963 A | 6/1977 | Poggemiller et al. | |
| 4,064,945 A | 12/1977 | Haney | |
| 4,176,721 A | 12/1979 | Poggemiller et al. | |
| 4,355,688 A | 10/1982 | Hamm et al. | |
| 4,385,353 A | 5/1983 | Schneider | |
| 4,413,685 A | 11/1983 | Gremelspacher et al. | |
| 4,423,788 A | 1/1984 | Robinson, Jr. et al. | |
| 4,461,355 A | 7/1984 | Peterson et al. | |
| 4,522,066 A | 6/1985 | Kistler et al. | |
| 4,648,466 A | 3/1987 | Baker et al. | |
| 4,759,301 A | 7/1988 | Thomas | |
| 4,766,962 A | 8/1988 | Frase | |
| 4,913,070 A | 4/1990 | Morrison, Jr. | |
| 5,025,951 A | 6/1991 | Hook et al. | |
| 5,160,055 A | 11/1992 | Gray | |
| 5,163,518 A | 11/1992 | Foley | |
| 5,234,060 A * | 8/1993 | Carter ................... | A01B 63/22 172/260.5 |
| 5,348,101 A | 9/1994 | Fox et al. | |
| 5,499,683 A | 3/1996 | Bassett | |
| 5,544,709 A | 8/1996 | Lowe et al. | |
| 5,562,165 A | 10/1996 | Janelle et al. | |
| 5,709,271 A | 1/1998 | Bassett | |
| 6,070,539 A | 6/2000 | Flamme et al. | |
| 6,076,611 A * | 6/2000 | Rozendaal ............. | A01B 63/32 172/2 |
| 6,125,775 A | 10/2000 | Gust | |
| 6,164,385 A | 12/2000 | Buchl | |
| 6,389,999 B1 * | 5/2002 | Duello .................. | A01O 5/064 111/200 |
| 6,460,623 B1 | 10/2002 | Knussman et al. | |
| 6,480,808 B1 | 11/2002 | Early et al. | |
| 6,688,245 B2 | 2/2004 | Juptner | |
| 6,701,857 B1 * | 3/2004 | Jensen ................... | A01B 63/32 111/200 |
| 6,827,029 B1 | 12/2004 | Wendte | |
| 6,935,253 B2 | 8/2005 | Murray et al. | |
| 6,983,705 B1 | 1/2006 | Gust | |
| 7,308,859 B2 | 12/2007 | Wendte et al. | |
| 7,552,577 B2 * | 6/2009 | Strosser ............... | A01D 41/141 56/10.2 R |
| 7,938,074 B2 | 5/2011 | Liu | |
| 8,327,780 B2 | 12/2012 | Bassett | |
| 8,359,988 B2 | 1/2013 | Bassett | |
| 8,430,179 B2 | 4/2013 | Van Buskirk et al. | |
| 8,528,656 B2 | 9/2013 | Van Buskirk et al. | |
| 8,534,373 B2 | 9/2013 | Van Buskirk et al. | |
| 8,544,397 B2 | 10/2013 | Bassett | |
| 8,544,398 B2 * | 10/2013 | Bassett .................. | A01C 7/205 111/135 |
| 8,601,961 B2 | 12/2013 | Van Buskirk et al. | |
| 8,634,992 B2 * | 1/2014 | Sauder .................. | A01C 7/205 111/135 |
| 8,636,077 B2 | 1/2014 | Bassett | |
| 8,763,713 B2 | 7/2014 | Bassett | |
| 8,770,308 B2 | 7/2014 | Bassett | |
| 8,776,702 B2 | 7/2014 | Bassett | |
| 8,820,251 B2 | 9/2014 | Van Buskirk et al. | |
| 8,839,726 B2 | 9/2014 | Van Buskirk et al. | |
| 8,863,857 B2 | 10/2014 | Bassett | |
| 8,997,447 B2 | 4/2015 | Yaske et al. | |
| 9,055,712 B2 | 6/2015 | Bassett | |
| 9,144,187 B2 | 9/2015 | Bassett | |
| 9,144,189 B2 * | 9/2015 | Stoller .................. | A01O 5/062 |
| 9,155,237 B2 | 10/2015 | Van Buskirk et al. | |
| 9,167,740 B2 | 10/2015 | Bassett | |
| 9,192,089 B2 | 11/2015 | Bassett | |
| 2003/0079162 A1 | 4/2003 | Sutton | |
| 2005/0155536 A1 | 7/2005 | Wendte et al. | |
| 2008/0008271 A1 | 1/2008 | Lee et al. | |
| 2008/0011208 A1 | 1/2008 | Martin | |
| 2008/0093093 A1 | 4/2008 | Sheppard et al. | |
| 2008/0257570 A1 | 10/2008 | Keplinger et al. | |
| 2010/0180695 A1 | 7/2010 | Sauder et al. | |
| 2010/0198529 A1 | 8/2010 | Sauder et al. | |
| 2010/0275827 A1 | 11/2010 | Van Buskirk et al. | |
| 2011/0036602 A1 | 2/2011 | Bassett | |
| 2011/0088603 A1 | 4/2011 | Bassett | |
| 2011/0232550 A1 | 9/2011 | Van Buskirk et al. | |
| 2012/0050023 A1 | 3/2012 | Sauder et al. | |
| 2012/0060730 A1 * | 3/2012 | Bassett .................. | A01C 7/205 111/149 |
| 2012/0060731 A1 | 3/2012 | Bassett | |
| 2012/0186216 A1 | 7/2012 | Vaske et al. | |

* cited by examiner

US 9,879,702 B2

INTEGRATED IMPLEMENT DOWNFORCE CONTROL SYSTEMS, METHODS, AND APPARATUS

BACKGROUND

In operating an agricultural implement such as a row crop planter, maintaining a desired "downforce" between the soil and ground-engaging wheels of each row unit is difficult. Too much downforce can cause undesired compaction and yield loss, while insufficient downforce can cause the row unit to lose planting depth, resulting potential emergence failure. Recent advances in implement downforce measurement and mapping have highlighted the extreme spatial variation in applied downforce required to maintain desired downforce as moisture and soil properties change throughout the field being planted. Thus there is a need in the art for effectively controlling applied downforce with greater spatial granularity.

DESCRIPTION

Downforce Controller

Figure 1A:
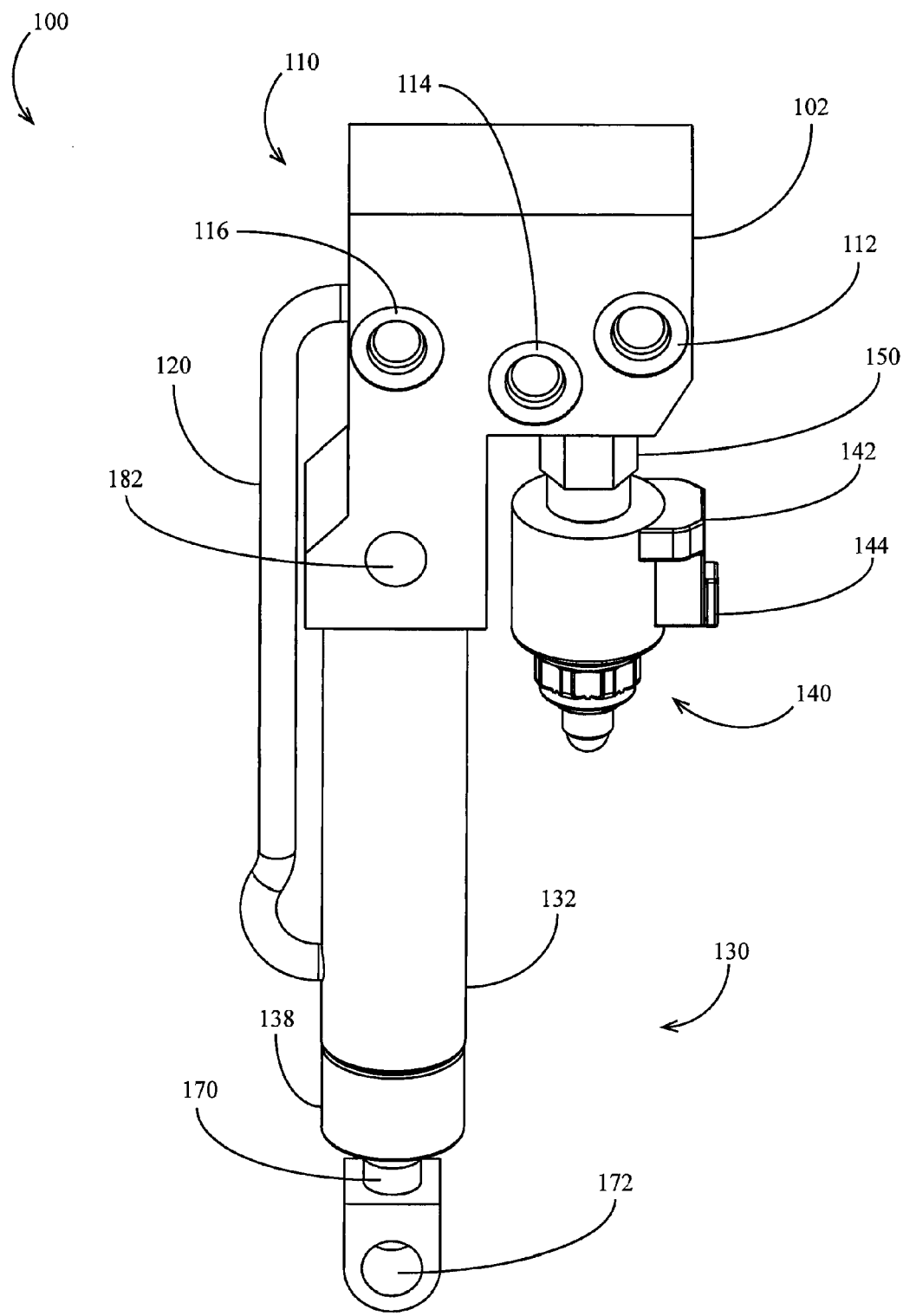
FIG. 1A is a perspective view of an embodiment of a downforce controller.
Figure 1B:
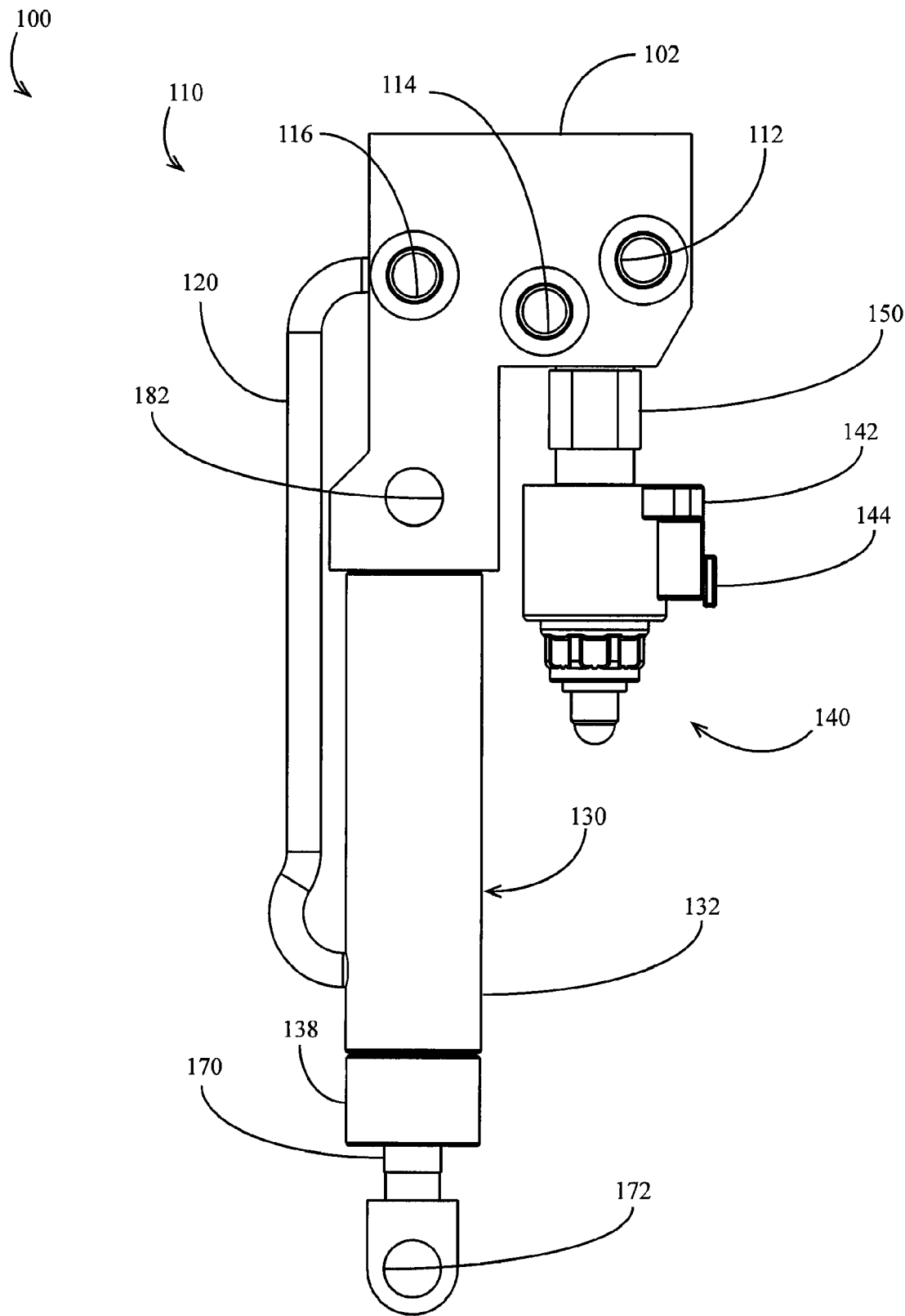
FIG. 1B is a side elevation view of an embodiment of the downforce controller of FIG. 1A.
Figure 1C:
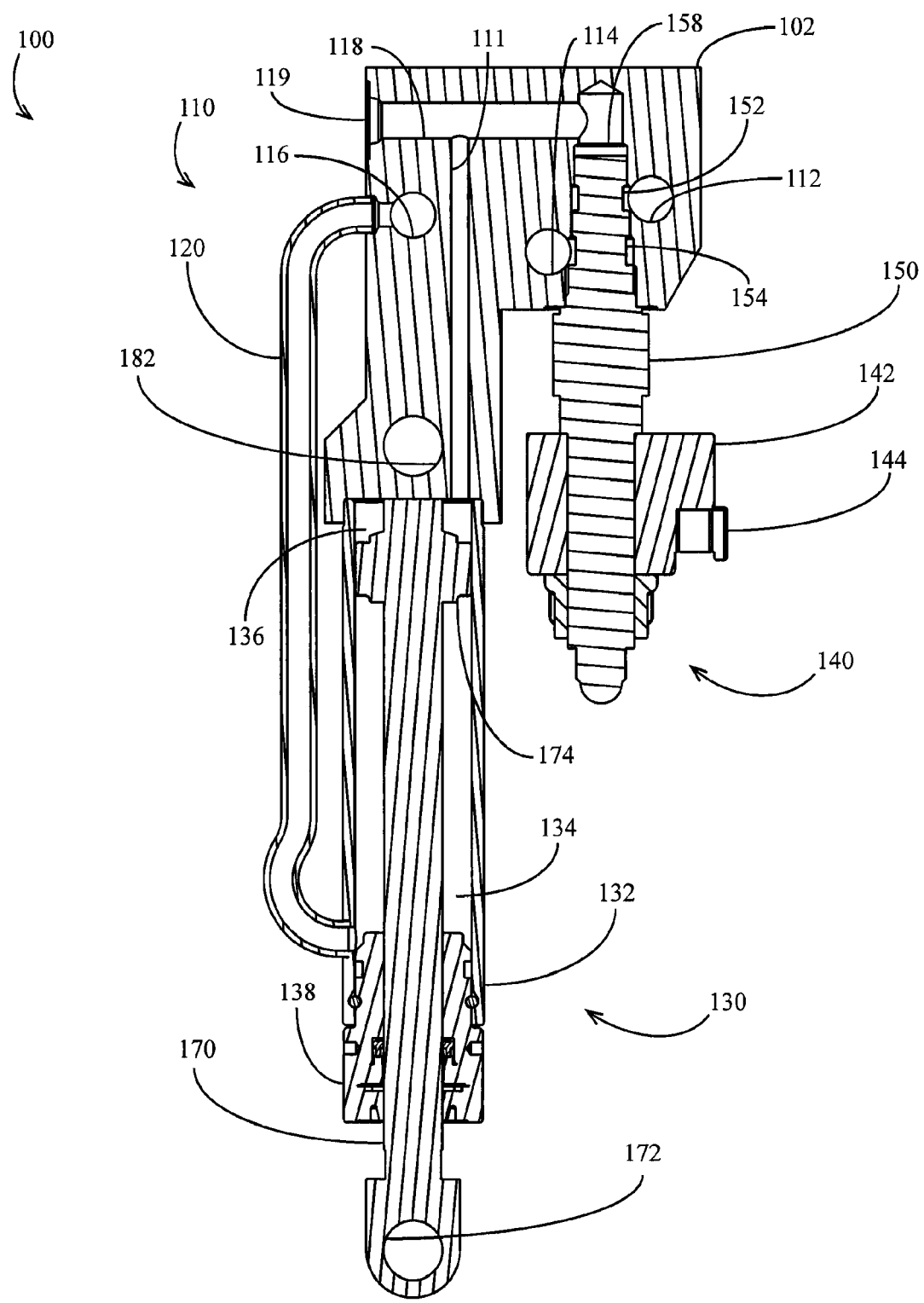
FIG. 1C is a cross-sectional view of the downforce controller of FIG. 1A.

Referring now to the drawings, wherein like reference numerals designate identical or corresponding parts throughout the several views, FIGS. 1A-1C illustrate an embodiment of a downforce controller 100. Referring to FIG. 1A, the downforce controller 100 includes a manifold 110 and a cylinder 130. The manifold 110 preferably includes a manifold body 102, a lift control conduit 120, and a cavity sized to receive a down pressure control valve 140. It should be appreciated that as illustrated in FIGS. 1A-1C, the down pressure control valve 140 is coupled to the manifold 110 and is thus coupled to the cylinder 130; likewise, the valve is supported by the manifold 110 and is thus supported by the cylinder 130. The manifold body 102 preferably includes a supply passage 112, a return passage 114, and a lift control passage 116. Each passage 112, 114, 116 preferably includes a left fitting, a right fitting, and an aperture connecting the left and right fittings. Referring to the cross-sectional view of FIG. 1C, the manifold body 110 preferably includes a control pressure diagnostic passage 118 and a down chamber connection passage 111.

The cylinder 130 includes a barrel 132, a rod 170, and a gland 138. The cylinder 130 is mounted to the manifold 110. In the embodiment illustrated in FIGS. 1A-1C, the barrel 132 is mounted to the manifold body 102. Referring to the cross-sectional view of FIG. 1C, the gland 138 is mounted to a lower end of the barrel 132 and the rod 170 is slidably mounted within the gland 138. The rod 170 includes a piston 174 which separates an interior volume of the barrel 132 into a down chamber 136 and a lift chamber 134.

The down pressure control valve 140 is preferably a electro-hydraulic pressure reducing-relieving valve. The down pressure control valve 140 preferably includes a solenoid 142 having an electrical port 144. The down pressure control valve 140 preferably includes a flow control valve 150 having a supply port 152, a return port 154, and a control port 158 (FIG. 1C). The pressure control valve 140 is preferably a PDR08-P proportional pressure relief valve available from Hydac International GmbH in Sulzbach, Germany ("Hydac"). The down pressure control valve 140 is preferably mounted to the manifold body 102. The down pressure control valve 140 is preferably oriented substantially parallel with the cylinder 130.

Referring to FIG. 1C, the supply port 152 of the pressure control valve 140 is in fluid communication with the supply passage 112. The return port 154 is in fluid communication with the return passage 114. The control port 158 is in fluid communication with the control pressure diagnostic passage 118. The control pressure diagnostic passage 118 is in fluid communication with the down chamber connection passage 111. The down chamber connection passage 111 is in fluid communication with the down chamber 136. The control pressure diagnostic passage 118 and the down chamber connection passage 111 collectively comprise a passage placing the control port 158 in fluid communication with the down chamber 136. The conduit 120 places the lift control passage 116 in fluid communication with the lift chamber 134. The control pressure diagnostic passage 118 is preferably capped with a cap 119 which may be removed in order to place a gauge, transducer, or other pressure measurement device in fluid communication with the control port 158.

In operation, the flow control valve 150 establishes a control pressure at the control port 158 by selectively allowing flow between the control port 158, the supply port 152, and the return port 154 as is known in the art. The solenoid 142 changes an operating state of the down pressure control valve 140 (e.g., by imposing a force on a component of the flow control valve 150) to modify the control pressure as is known in the art. The control pressure set by the solenoid 142 preferably corresponds to a signal received at the electrical port 144. Thus the down pressure control valve 140 is configured to maintain any one of a continuous range of pressures at the control port 152, and is further configured to selectively maintain one of such continuous range of pressures based on the signal received by the solenoid 142.

Implement Installation and Operation

Figure 2A:
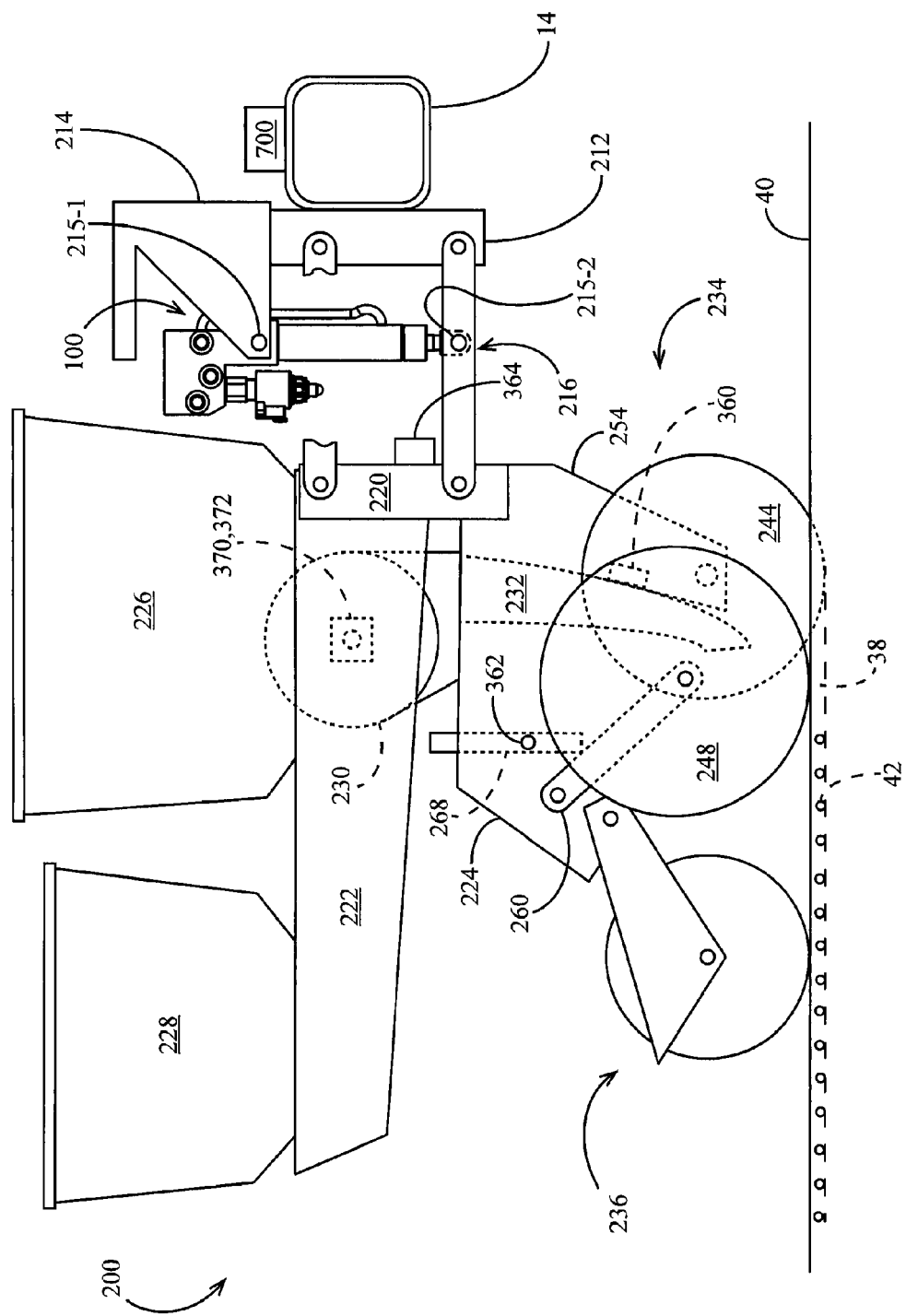
FIG. 2A is a side elevation view of an embodiment of a planter row unit incorporating the downforce controller of FIG. 1A.
Figure 2B:
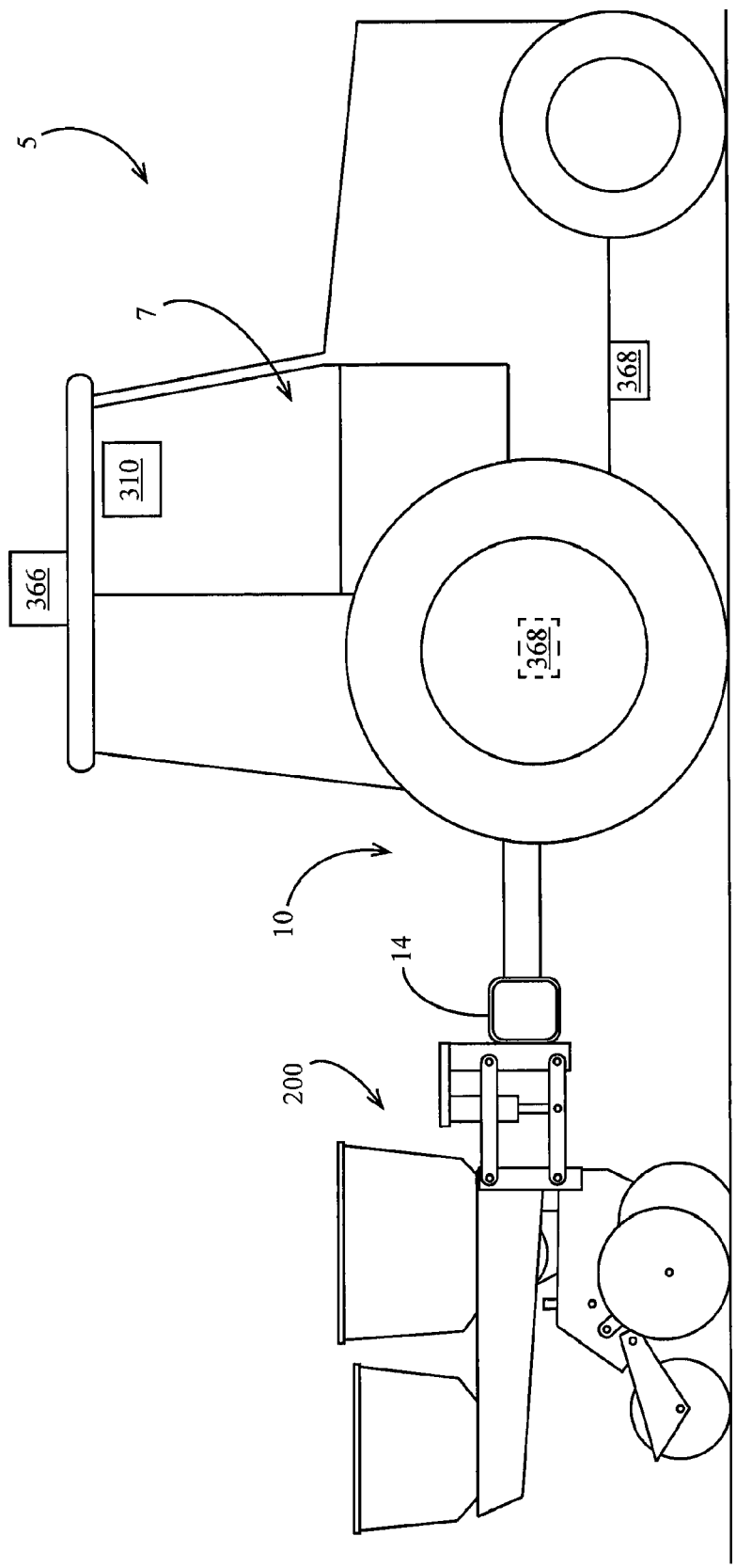
FIG. 2B is a side elevation view of an embodiment of a planter and a tractor drawing the planter row unit of FIG. 2A through a field.

Turning to FIGS. 2A and 2B, an embodiment of the downforce controller 100 is illustrated installed on a planter 10 drawn by a tractor 5. The planter 10 includes a transversely extending toolbar 14 to which multiple row units 200 are mounted in transversely spaced relation.

For attachment purposes, the manifold body 102 of the downforce controller 100 includes a pin eye 182 (FIGS. 1A-1C) and the rod 170 includes a clevis 172. Referring to FIG. 2A, a controller attachment bracket 214 is mounted to the front bracket 212. The downforce controller 100 is pivotally connected to the controller attachment bracket 214 by an upper pin 215-1 extending through the pin eye 182. The downforce controller 100 is pivotally connected at a lower end to a parallel linkage 216 by a lower pin 215-2 extending through the clevis 172. A manifold 700 is preferably mounted to the toolbar 14.

Continuing to refer to FIG. 2A, the parallel linkage 216 supports the row unit 200 from the toolbar 14, permitting each row unit to move vertically independently of the toolbar and the other spaced row units in order to accommodate changes in terrain or upon the row unit encountering a rock or other obstruction as the planter is drawn through the field. A ride quality sensor 364, preferably an accelerometer, is mounted to the row unit 200 and disposed to measure the vertical velocity and acceleration of the row unit 200. Each row unit 200 further includes a mounting bracket 220 to which is mounted a hopper support beam 222 and a subframe 224. The hopper support beam 222 supports a seed hopper 226 and a fertilizer hopper 228 as well as operably supporting a seed meter 230 and a seed tube 232. The subframe 224 operably supports a furrow opening assembly 234 and a furrow closing assembly 236.

In operation of the row unit 200, the furrow opening assembly 234 cuts a furrow 38 into the soil surface 40 as the planter 10 is drawn through the field. The seed hopper 226, which holds the seeds to be planted, communicates a constant supply of seeds 42 to the seed meter 230. The seed meter 230 of each row unit 200 is preferably selectively engaged to a drive 372 via a clutch 370 such that individual seeds 42 are metered and discharged into the seed tube 232 at regularly spaced intervals based on the seed population desired and the speed at which the planter is drawn through the field. The drive 372 and clutch 370 may be of the types disclosed in U.S. patent application Ser. No. 12/228,075, the disclosure of which is incorporated herein in its entirety by reference. A seed sensor 360, preferably an optical sensor, is supported by the seed tube 232 and disposed to detect the presence of seeds 42 as they pass. The seed 42 drops from the end of the seed tube 232 into the furrow 38 and the seeds 42 are covered with soil by the closing wheel assembly 236.

The furrow opening assembly 234 preferably includes a pair of furrow opening disk blades 244 and a pair of gauge wheels 248 selectively vertically adjustable relative to the disk blades 244 by a depth adjusting mechanism 268. The depth adjusting mechanism 268 preferably pivots about a downforce sensor 362, which preferably comprises a pin instrumented with strain gauges for measuring the force exerted on the gauge wheels 248 by the soil 40. The downforce sensor 362 is preferably of the type disclosed in Applicant's co-pending U.S. patent application Ser. No. 12/522,253, the disclosure of which is hereby incorporated herein in its entirety by reference. In other embodiments, the downforce sensor is of the types disclosed in U.S. Pat. No. 6,389,999, the disclosure of which is hereby incorporated herein in its entirety by reference. The disk blades 244 are rotatably supported on a shank 254 depending from the subframe 224. Gauge wheel arms 260 pivotally support the gauge wheels 248 from the subframe 224. The gauge wheels 248 are rotatably mounted to the forwardly extending gauge wheel arms 260.

Referring to FIG. 2B, a GPS receiver 366 is preferably mounted to an upper portion of the tractor 5. A monitor 310 is preferably mounted in a cab 7 of the tractor 5. One or more speed sensors 368, such as a Hall-effect wheel speed sensor or a radar speed sensor, are preferably mounted to the tractor 5.

Electrical Control System

Figure 3:
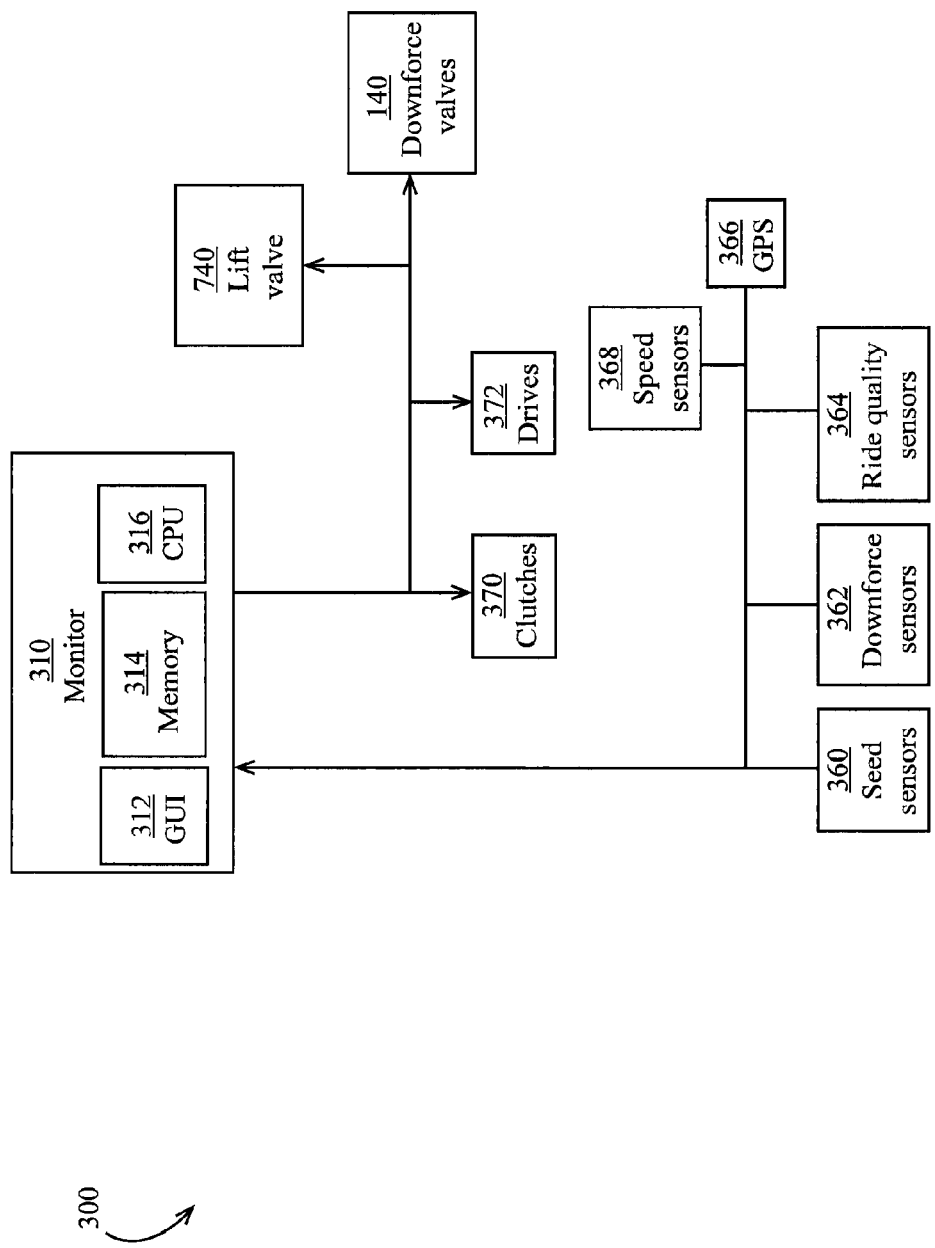
FIG. 3 schematically illustrates an embodiment of an electronic control system for controlling one or more downforce controllers.

Turning to FIG. 3, an electrical control system 300 for controlling and measuring downforce and other implement functions is illustrated schematically. In the electrical control system, the monitor 310 is preferably in electrical communication with the down pressure control valves 140 and a lift pressure control valve 740 (described herein with respect to FIG. 7), as well as the drives 370 and the clutches 372. The monitor 310 is preferably in electrical communication with the downforce sensors 362 as well as the seed sensors 360, the downforce sensors 362, the speed sensors 368, and the GPS receiver 366. It should be appreciated that the monitor 310 comprises an electronic controller.

The monitor 310 preferably includes a central processing unit ("CPU") 316, a memory 314, and a graphical user interface ("GUI") 312 allowing the user to view and enter data into the monitor. The monitor 310 is preferably of the type disclosed in Applicant's co-pending U.S. patent application Ser. No. 13/292,384, the disclosure of which is hereby incorporated herein in its entirety by reference, such that the monitor is capable of displaying downforce and seeding information to the user.

Downforce Fluid Control System

Figure 4:
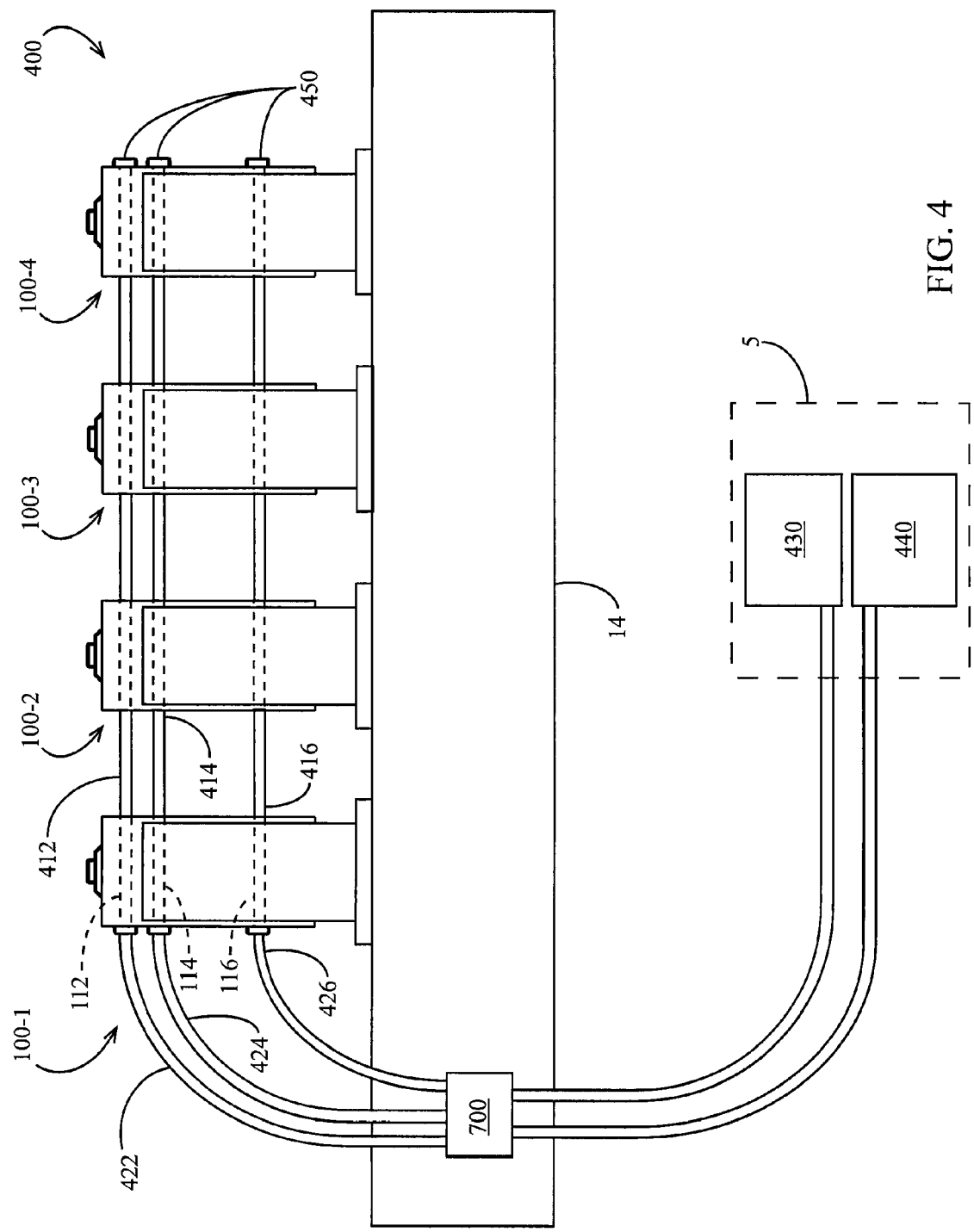
FIG. 4 is a top view of an embodiment of a fluid control system for controlling multiple downforce controllers.

Turning to FIG. 4, an embodiment of a fluid control system 400 is illustrated installed on four downforce controllers 100 (each installed on a respective row unit 200), the toolbar 14 and the tractor 5. The fluid control system includes a supply 430, preferably a power-beyond supply port located on the tractor 5, and a tank 440, preferably a power-beyond tank port located on the tractor 5. The supply 430 and tank 440 are in fluid communication with the manifold 700.

Figure 7:
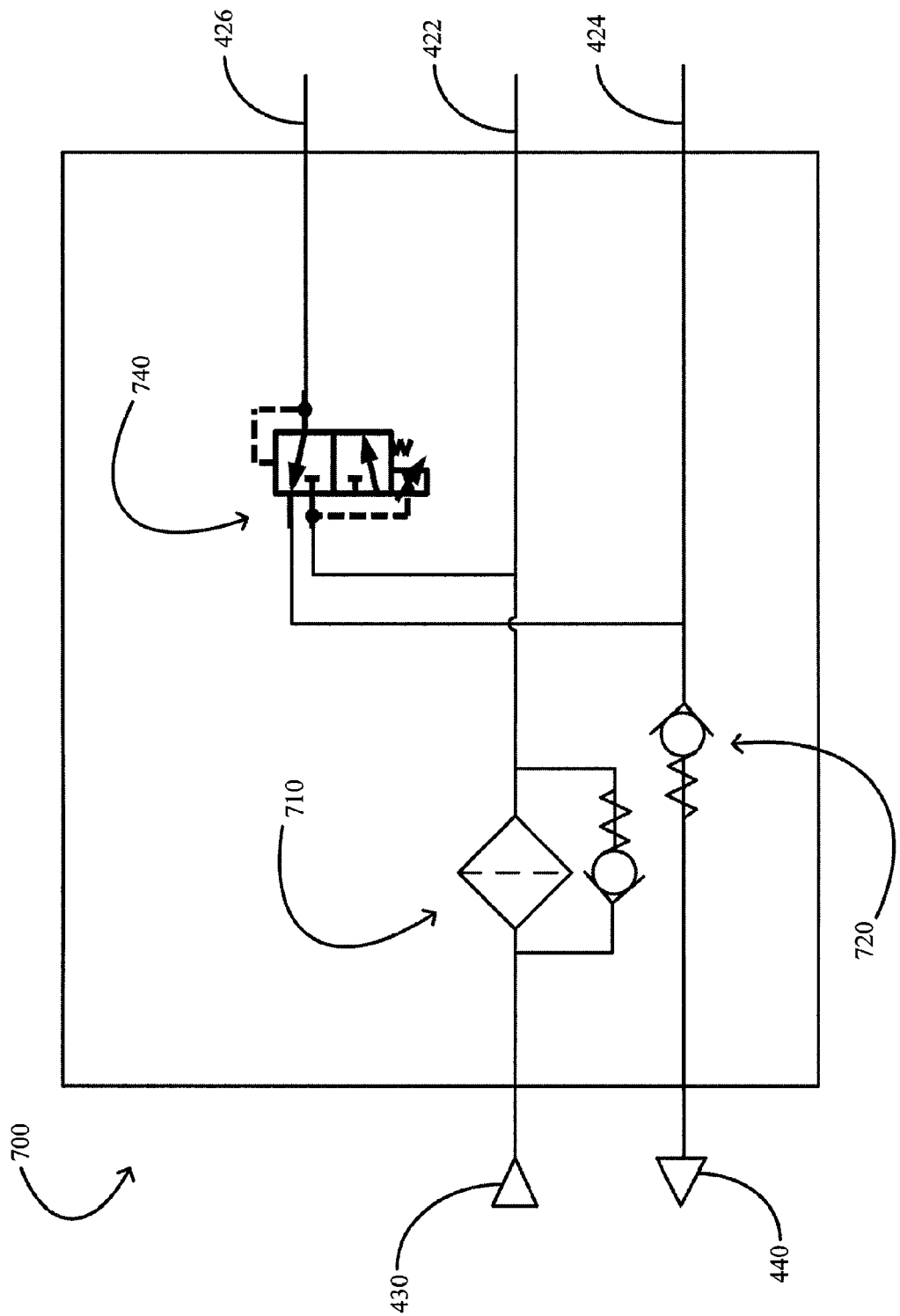
FIG. 7 is a fluid schematic illustrating an embodiment of a manifold for controlling pressure delivered to a downforce controller.

Turning to FIG. 7, an embodiment of the manifold 700 is illustrated schematically. The manifold 700 includes a filter 710 (preferably model no. CP-SAE-120 available from Hydac), a check valve 720 (preferably model no. RV16A-01 available from Hydac), a float select valve 735 (preferably model no. PD10-41-0-N-170 available from Hydraforce in Lincolnshire, Ill.), and the lift pressure control valve 740 (preferably an equivalent valve to the down pressure control valve 140). The supply 430 is in fluid communication with the filter 710, a pressure port of the lift pressure control valve 740, and a supply hose 422 connected to a supply port of the manifold 700. The tank 440 is in fluid communication with the check valve 720, a tank port of the lift pressure control valve 740, and a return hose 424 connected to a return port of the manifold 700. A control port of the lift pressure control valve 740 is preferably in fluid communication with a first port of the float select valve 735. A second port of the float select valve is preferably in fluid communication with the return hose 424. A third port of the float select valve is preferably in fluid communication with a lift control hose 426 connected to a lift control port of the manifold 700.

In operation, the lift pressure control valve 740 receives a command signal and maintains a desired pressure at the control port of the lift pressure control valve corresponding to the command signal. When the pressure in the lift control hose 426 exceeds the pressure in the return hose 424 by a threshold (e.g., 170 psi), as for example when one or more of the row units 200 drops relative to the toolbar causing substantial fluid flow from the lift control hose through the float select valve 734, the float select valve is preferably configured to shift into the position shown in FIG. 7 such that fluid is allowed to bypass the lift pressure control valve 740 and return to the return hose 424.

Returning to FIG. 4, the supply hose 422 is in fluid communication with the supply passage 112 of the first downforce controller 100-1. The supply passage 112 of each downforce controller 100 is in fluid communication with the supply passage 112 of an adjacent downforce controller 100 via an inter-row supply hose 412. The distal port of the supply passage 112 of the distal downforce controller (e.g., the right-hand port of the supply passage of the downforce controller 100-4 as illustrated in FIG. 4) is preferably capped with a cap 450. It should be appreciated in view of FIG. 4 and the description above that a first end of the inter-row supply hose 412 is coupled to and supported by the supply passage 112 of a first downforce controller (e.g., the downforce controller 100-1) and a second end of the inter-row supply hose 412 is coupled to and supported by the supply passage 112 of a second, preferably adjacent downforce controller (e.g., the downforce controller 100-2).

The return hose 424 is in fluid communication with the return passage 114 of the first downforce controller 100-1. The return passage 114 of each downforce controller 100 is in fluid communication with the return passage 114 of an adjacent downforce controller 100 via an inter-row return hose 414. The distal port of the return passage 114 of the distal downforce controller (e.g., the right-hand port of the return passage of the downforce controller 100-4 as illustrated in FIG. 4) is preferably capped with a cap 450. It should be appreciated in view of FIG. 4 and the description above that a first end of the inter-row return hose 414 is coupled to and supported by the return passage 114 of a first downforce controller (e.g., the downforce controller 100-1) and a second end of the inter-row return hose 414 is coupled to and supported by the return passage 114 of a second, preferably adjacent downforce controller (e.g., the downforce controller 100-2).

The lift control hose 426 is in fluid communication with the lift control passage 116 of the first downforce controller 100-1. The lift control passage 116 of each downforce controller 100 is in fluid communication with the lift control passage 116 of an adjacent downforce controller 100 via an inter-row lift hose 416. The distal port of the lift control passage 116 of the distal downforce controller (e.g., the right-hand port of the lift control passage of the downforce controller 100-4 as illustrated in FIG. 4) is preferably capped with a cap 450. It should be appreciated in view of FIG. 4 and the description above that a first end of the inter-row lift hose 416 is coupled to and supported by the lift control passage 116 of a first downforce controller (e.g., the downforce controller 100-1) and a second end of the inter-row lift hose 416 is coupled to and supported by the lift control passage 116 of a second, preferably adjacent downforce controller (e.g., the downforce controller 100-2).

It should be appreciated in light of FIG. 4 and the corresponding description above that each of the downforce controllers 100 (and thus the associated down chambers 136 of each of the cylinders 130) are in fluid communication "in series", e.g., fluid from the supply hose 422 passes through the supply passage 112 of the downforce controller 100-1 before reaching the supply passage 112 of the downforce controller 100-2. Likewise, each of the lift pressure chambers 160 are in fluid communication "in series", e.g., fluid from the lift control hose 426 passes through the lift control passage 116 of the downforce controller 100-1 before reaching the lift control passage 116 of the downforce controller 100-2.

It should be appreciated that a single fluid control system 400 may control all of the row units 200 drawn by the toolbar 14, or a subset thereof. Moreover, it should be appreciated that multiple fluid control systems 400 may control separate subsets or "sections" of row units 200 such that the lift pressure in each section may be controlled independently. For example, three fluid control systems 400 may be used to independently control a right section comprising a first plurality of row units 200 mounted to a right portion of the toolbar 14, a center section comprising a second plurality of row units mounted to a central portion of the toolbar 14, and a left section comprising a third plurality of row units mounted to a left portion of the toolbar 14.

Operation

In operation of the fluid control system 400 and the electronic control system 300, the monitor 310 preferably receives a downforce signal from each downforce sensor 362. The monitor 310 preferably uses the downforce signal to display the downforce measured at each row unit 200. The monitor 310 preferably uses the downforce signal to select a target net downforce to be applied to each row unit 200 by each downforce controller 100. For example, if the downforce signal for a given row unit 200 is in excess of a threshold, the monitor 310 preferably reduces the target net downforce to be applied by the corresponding controller 100. In other embodiments, the monitor 310 allows the user to simply select a target net downforce for each downforce controller 100. Once the target net downforce is selected for each downforce controller, the monitor 310 preferably sends control signals to each down pressure control valve 140 and the lift pressure control valve 740 such that the net downforce applied by each downforce controller 100 more closely approximates the corresponding target net downforce. In some embodiments, the monitor 310 selects desired control pressures according to the methods disclosed in Applicant's U.S. patent application No. 61/515,700, the disclosure of which is hereby incorporated herein in its entirety by reference.

Downforce Controller—Alternative Embodiments

Figure 5:
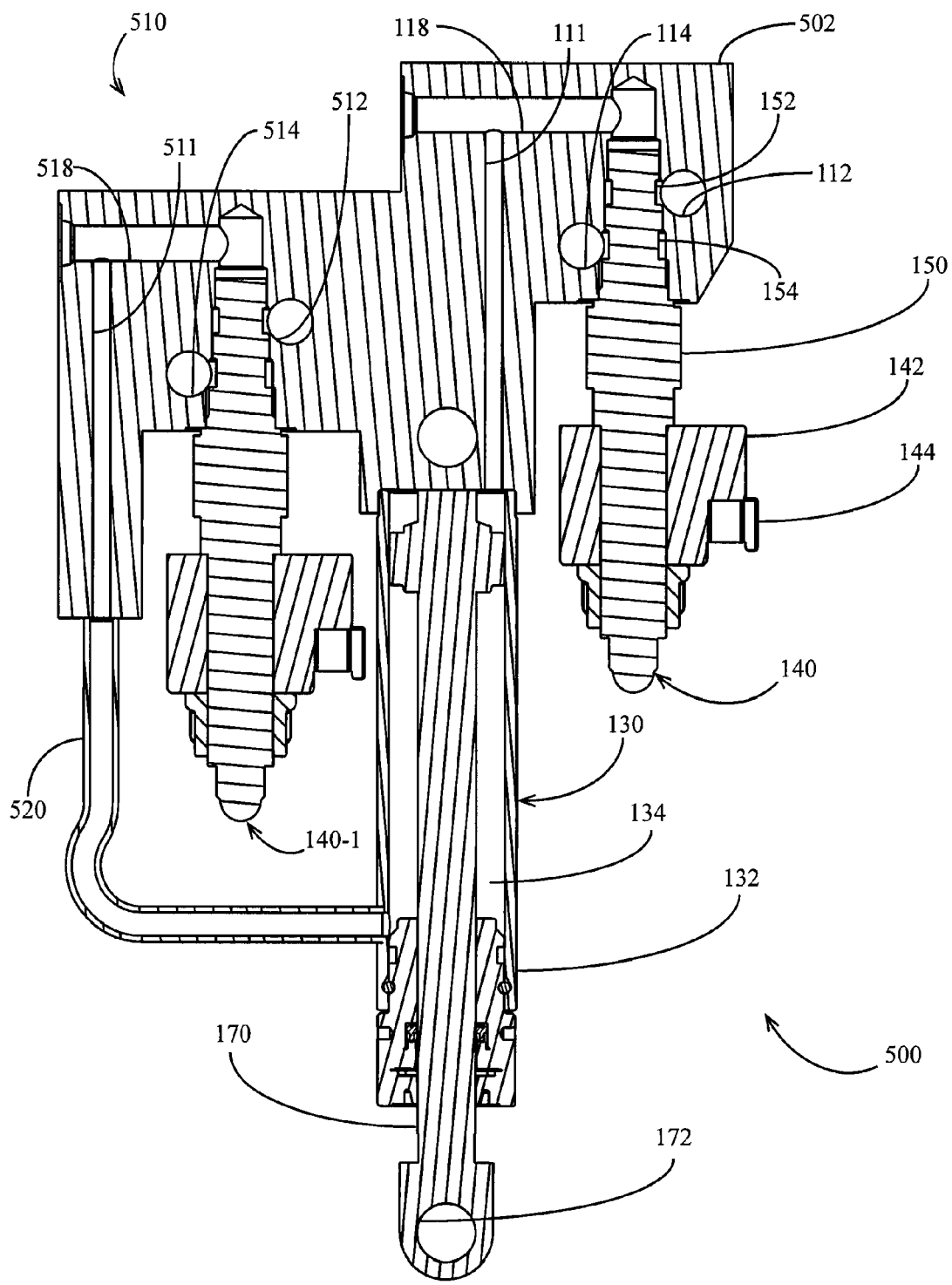
FIG. 5 is a cross-sectional view of another embodiment of a downforce controller including a lift pressure control valve.

Turning to FIG. 5, an alternative embodiment of a modified downforce controller 500 is illustrated in cross-section. The downforce controller 500 includes a modified manifold 510 and a modified conduit 520, allowing incorporation of an individual lift control valve 140-1 to control the pressure in the lift chamber 134. The individual lift pressure control valve 140-1 is preferably substantially similar to the pressure control valve 140. It should be appreciated that the right hand side of the manifold 510 is similar to the manifold 110 except that the lift control passage 116 is preferably omitted.

The manifold 510 preferably includes a manifold body 502, a lift control conduit 520, and a cavity sized to receive the individual lift pressure control valve 140-1. The manifold body 502 preferably includes a supply passage 512 and a return passage 514. Each passage 512,514 preferably includes a left fitting, a right fitting, and an aperture connecting the left and right fittings. The manifold body 510 preferably includes a control pressure diagnostic passage 518 and a down chamber connection passage 511.

The supply port of the individual lift pressure control valve 140-1 is in fluid communication with the supply passage 512. The return port of the individual lift pressure control valve 140-1 is in fluid communication with the return passage 514. The control port of the individual lift pressure control valve 140-1 is in fluid communication with the control pressure diagnostic passage 518. The control pressure diagnostic passage 518 is in fluid communication with the down chamber connection passage 511. The down chamber connection passage 511 is in fluid communication with the down chamber 136. The control pressure diagnostic passage 518 and the down chamber connection passage 511 collectively comprise a passage placing the control port of the individual lift pressure control valve 140-1 in fluid communication with the down chamber 136. The conduit 520 places the lift control passage 516 in fluid communication with the lift chamber 134. The control pressure diagnostic passage 518 is preferably capped with a cap (not shown) which may be removed in order to place a gauge or other pressure measurement device in fluid communication with the control port of the individual lift pressure control valve 140-1.

Figure 6:
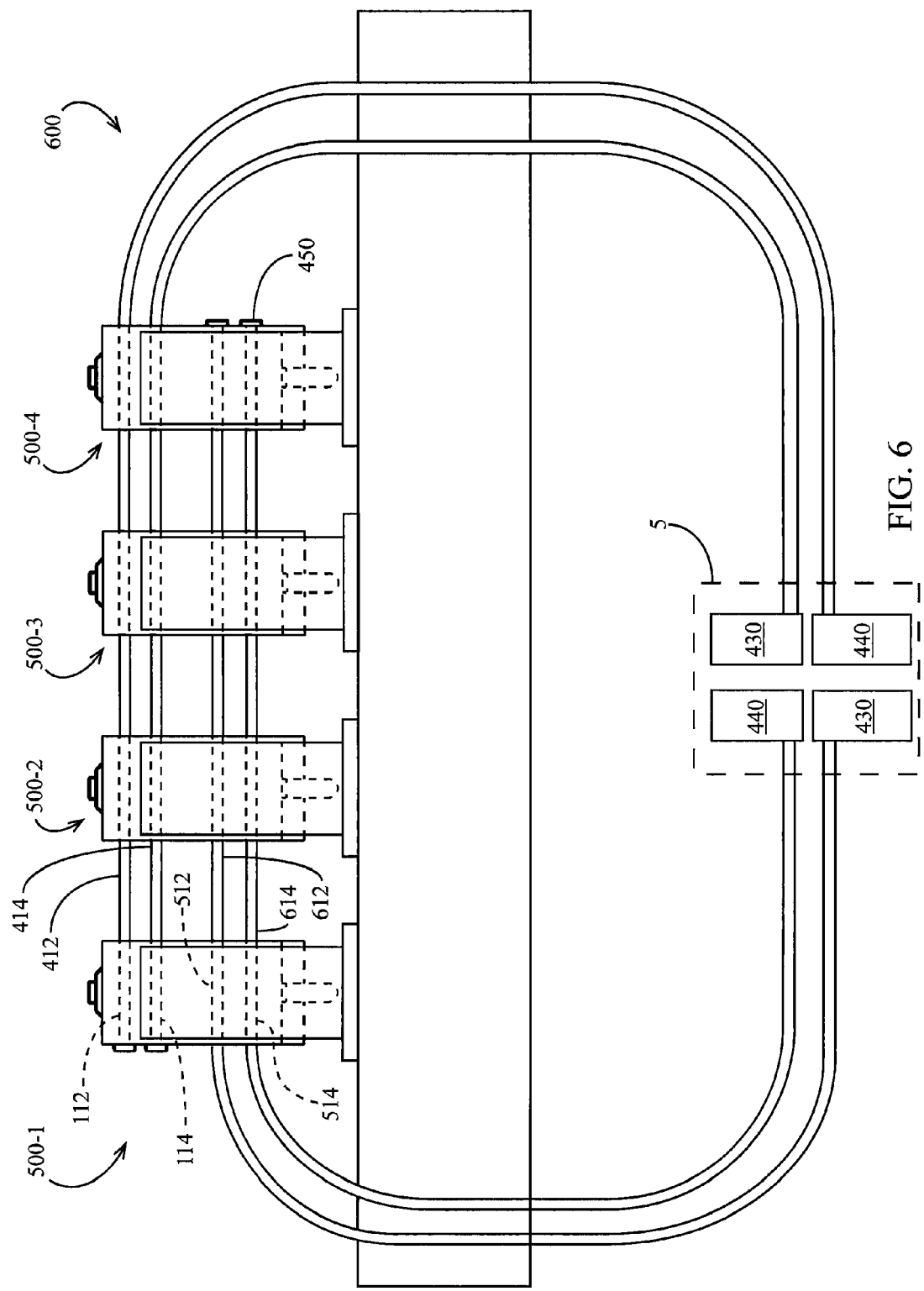
FIG. 6 is a top view of another embodiment of a fluid control system for controlling multiple downforce controllers.

Turning to FIG. 6, a modified fluid control system 600 is illustrated installed on four downforce controllers 500 (each installed on a respective row unit 200), the toolbar 14 and the tractor 5. The fluid control system 600 preferably includes the same supply 430 and tank 440 as the fluid control system 500.

The supply passage 112 and return passage 114 of the first downforce controller 500-1 are in fluid communication with the supply 430 and the tank 440, respectively. As with the fluid control system 500, the supply passage 112 and the return passage 114 of each downforce controller 500 are in fluid communication with the supply passage 112 and the return passage 114, respectively, of an adjacent downforce controller 500 via the supply hose 412 and the return hose 414, respectively.

Similarly, the supply passage 512 and return passage 514 of the rightmost downforce controller 500-4 are in fluid communication with the supply 430 and the tank 440, respectively. The supply passage 512 and the return passage 514 of each downforce controller 500 are in fluid communication with the supply passage 512 and the return passage 514, respectively, of an adjacent downforce controller 500 via an inter-row supply hose 612 and an inter-row return hose 614, respectively.

The individual lift control valve 140-1 is preferably in electrical communication with the monitor 130. In operation of the modified fluid control system 600, the monitor 130 is preferably configured to select pressures of both the lift pressure control valve 140-1 and the down pressure control valve 140-1. The monitor 130 is preferably configured to alter the commanded lift pressure and down pressure for each downforce controller 500 based on the downforce signal received from the downforce sensor 362 of the corresponding row unit 200.

In other embodiments of the downforce controller 500, the down chamber connection passage 511 is in fluid communication with the control port of the lift pressure control valve 140-1 via a pilot-operated blocking valve whose pilot pressure port is in fluid communication with the control port of the down pressure control valve 140-1 such that lift pressure is only applied when the down pressure exceeds a threshold. Similarly, in other embodiments of the downforce controller 100, the lift control passage 116 is in fluid communication with the conduit 120 via a pilot-operated blocking valve whose pilot pressure port is in fluid communication with the control port of the down pressure control valve 140 such that lift pressure is only applied when the down pressure exceeds a threshold. In such embodiments, the pilot-operated blocking valve is preferably housed within the manifold body.

In other embodiments of the downforce controller 100 and the downforce controller 500, the down pressure control valve 140 and/or the lift pressure control valve 740 and/or the individual lift pressure control valve 140-1 are replaced with a manually operated pressure reducing-relieving valves such that the user may manually select the lift and/or down pressure applied to each row unit 200.

In still other embodiments of the downforce controller 100, a spring is incorporated in the lift chamber 134 such that the spring is compressed as the rod 170 extends. A bottom of the spring is preferably adjustable from outside the cylinder (e.g., by a lockable sliding mechanism supporting an annular ring on which the spring rests) such that the user is enabled to adjust the compression and reaction force of the spring as the rod extends. In such embodiments, the conduit 120 and lift control passage 116 are preferably omitted.

Diagnostic Methods

In the event of a fluid leakage in one of the cylinders 130, the monitor 310 is preferably configured to carry out one or more diagnostic processes to identify the leaking cylinder.

In a first diagnostic process, the monitor 310 preferably commands zero or small pressure at each of the down pressure control valves 140 and commands a lift pressure to the lift pressure control valve 740 theoretically sufficient (i.e., without system leakage) to raise all of the row units 200. The monitor 310 preferably alerts the operator to confirm that all of the row units 200 have raised. The monitor 310 then preferably increases the pressure commanded to each down pressure control valve 140 one at a time to a pressure theoretically sufficient to counter the lift pressure and lower the row units 200. The monitor 310 preferably alerts the operator to verify that each row unit 200 has been lowered.

In a second diagnostic process, the monitor 310 preferably commands a pressure the lift pressure control valve 740 sufficient to raise the row units 200 and simultaneously commands a pressure to all of the down pressure control valves 140 theoretically sufficient to retain all of the row units 200 in a lowered position. The monitor 310 preferably alerts the operator to confirm that none of the row units 200 have raised. The monitor 310 then preferably reduces the pressure commanded to each down pressure control valve 140 one at a time such that each row unit 200 should raise. The monitor 310 preferably alerts the operator to verify that each row unit 200 has been raised.

In alternative embodiments of the first and second diagnostic processes, rather than (or in addition to) alerting the operator to verify that the row units 200 have raised or lowered, the monitor 310 determines whether each row unit 200 is raised or lowered by comparing the signal received from each downforce sensor 362 to a threshold value; the threshold value preferably corresponds to a small amount of ground force (e.g., 10 pounds) on the row unit.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A downforce controller for an agricultural implement, comprising:
   a double-acting hydraulic cylinder including a first chamber and a second chamber, said cylinder configured to be coupled to an agricultural row unit and an agricultural toolbar for transmitting a net downforce between said agricultural toolbar and said agricultural row unit, a first pressure in said first chamber and a second pressure in said second chamber having counteracting effects on said net downforce;

a manifold coupled to said cylinder, said manifold being in fluid communication with said first chamber; and a pressure control valve supported by said manifold, said pressure control valve being in fluid communication with said manifold and with said first chamber;

wherein said pressure control valve comprises a supply port, a return port, and a control port, and wherein said pressure control valve is configured to establish a desired pressure at said control port; and wherein said pressure control valve is supported by said manifold.

2. The downforce controller of claim 1, wherein said pressure control valve is configured to maintain any one of a continuous range of pressures in said first chamber.

3. The downforce controller of claim 2, wherein said manifold includes a counteracting pressure control passage in fluid communication with said second chamber.

4. The downforce controller of claim 3, wherein said counteracting pressure control passage is in fluid communication with a counteracting pressure control valve, said counteracting pressure control valve mounted outside of said row unit.

5. The downforce controller of claim 4, wherein said counteracting control passage is in fluid communication with a second counteracting pressure control passage of a second downforce controller, said second downforce controller being coupled to a second row unit, wherein said counteracting pressure control passage is in fluid communication with a second counteracting pressure control passage of said second downforce controller, and further including an inter-row counteracting pressure hose extending between the downforce controller and the second downforce controller, said inter-row counteracting pressure hose being supported by said downforce controller and said second downforce controller.

6. The downforce controller of claim 5, wherein said pressure control valve and said counteracting pressure control valve are in electronic communication with an electronic controller, said electronic controller being configured to generate a first signal corresponding to a desired pressure in said pressure control valve, said electronic controller being configured to generate a second signal corresponding to a desired pressure in said counteracting pressure control valve.

7. The downforce controller of claim 4, wherein said pressure control valve and said counteracting pressure control valve are in electronic communication with an electronic controller, said electronic controller being configured to generate a first signal corresponding to a desired pressure in said pressure control valve, said electronic controller being configured to generate a second signal corresponding to a desired pressure in said counteracting pressure control valve.

8. The downforce controller of claim 1, wherein said manifold includes a supply passage in fluid communication with said supply port, wherein said manifold includes a return passage in fluid communication with said return port.

9. The downforce controller of claim 8, wherein said manifold includes a control passage in fluid communication with said control port, said control passage also being in fluid communication with said first chamber.

10. The downforce controller of claim 9, wherein said supply passage is in fluid communication with a second supply passage of a second downforce controller, said second downforce controller being coupled to a second row unit.

11. The downforce controller of claim 10, further including an inter-row supply hose extending between said downforce controller and said second downforce controller, said inter-row supply hose supported said downforce controller and said second downforce controller.

12. The downforce controller of claim 10, wherein said return passage is in fluid communication with a second return passage of said second downforce controller.

13. The downforce controller of claim 1, wherein said pressure control valve is substantially parallel to said cylinder.

14. A downforce control system for an agricultural implement, comprising:

a first downforce controller including a first pressure control valve, said first pressure control valve being supported by said first downforce controller, said first pressure control valve being in fluid communication with a first manifold, said first manifold coupled to a first actuator having a first chamber and a second chamber, said first pressure control valve in fluid communication with each said first chamber;

a second downforce controller including a second pressure control valve, said second pressure control valve being supported by said second downforce controller, said second pressure control valve being in fluid communication with a second manifold, said second manifold coupled to a second actuator having a third chamber and a fourth chamber, said second pressure control valve in fluid communication with each said third chamber;

a third pressure control valve in fluid communication with said second chamber and said fourth chamber; and an electronic controller, said electronic controller being in electrical communication with said first pressure control valve, said second pressure control valve, and said third pressure control valve, said electronic controller being configured to generate a first signal corresponding to a desired pressure in said pressure control valve, said electronic controller being configured to generate a second signal corresponding to a desired pressure in said second pressure control valve, said electronic controller being configured to generate a third signal corresponding to a desired pressure in said third pressure control valve.

15. The downforce control system of claim 14, wherein said third pressure control valve is mounted apart from said first downforce controller and apart from said second downforce controller.

16. The downforce control system of claim 14, further including an inter-row supply hose extending between said first downforce controller and said second downforce controller, wherein said inter-row supply hose is supported at a first end by said first downforce controller, and wherein said inter-row supply hose is supported at a second end by said second downforce controller.

17. The downforce control system of claim 16, wherein said inter-row supply hose is in fluid communication with said first pressure control valve and said second pressure control valve.

18. The downforce control system of claim 17, further including a second hose extending between said first downforce controller and said second downforce controller, wherein said second hose is supported at a first end by said first downforce controller, and wherein said second hose is supported at a second end by said second downforce controller, and wherein said second hose is in fluid communication with said second chamber and said fourth chamber.

19. The downforce control system of claim 18, wherein said first pressure control valve is supported by said first manifold, and wherein said second control valve is supported by said second manifold.

\* \* \* \* \*